US009868213B2

(12) United States Patent
Fine et al.

(10) Patent No.: US 9,868,213 B2
(45) Date of Patent: Jan. 16, 2018

(54) INCIDENTAL ROBOT-HUMAN CONTACT DETECTION (71) Applicant: EMPIRE TECHNOLOGY DEVELOPMENT LLC, Wilmington, DE (US)

(72) Inventors: Kevin S Fine, Yverdon-les-Bains (CH); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 52 days.

(21) Appl. No.: 14/823,500

(22) Filed: Aug. 11, 2015

(65) Prior Publication Data
US 2017/0043483 A1 Feb. 16, 2017

(51) Int. Cl.
B25J 9/16 (2006.01)

(52) U.S. Cl.
CPC ... *B25J 9/1676* (2013.01); *G05B 2219/40201* (2013.01); *Y10S 901/09* (2013.01); *Y10S 901/15* (2013.01); *Y10S 901/46* (2013.01)

(58) Field of Classification Search
None
See application file for complete search history.

(56) References Cited

U.S. PATENT DOCUMENTS

| 4,661,797 A * | 4/1987 | Schmall | B23Q 5/58 324/661 |
|---|---|---|---|
| 5,436,613 A * | 7/1995 | Ghosh | F16P 3/14 324/663 |
| 6,016,607 A * | 1/2000 | Morimoto | A61B 34/76 33/1 M |
| RE42,256 E * | 3/2011 | Edwards | G06K 9/00369 382/173 |
| 8,090,194 B2 * | 1/2012 | Golrdon | G01B 11/2513 382/154 |
| 8,555,762 B1 | 10/2013 | Jones | |
| 8,676,379 B2 | 3/2014 | Okazaki | |

(Continued)

FOREIGN PATENT DOCUMENTS

KR 10-1329853 B1 11/2013

OTHER PUBLICATIONS

Hutchinson, Seth et al., "A Tutorial Visual Servo Control," IEEE Transactions on Robotics and Automation, 1996, pp. 651-670, vol. 12 issue.5, IEEE.*

(Continued)

*Primary Examiner* — Ryan Rink
(74) *Attorney, Agent, or Firm* — Turk IP Law, LLC (57) ABSTRACT Technologies are generally described for detection of incidental robot-human contact. In some examples, a robotic actuator movement may generate a feedback signal, such as a haptic signal, a proprioceptive signal, an optical signal, and/or an infrared signal. A tremor detector may determine whether the feedback signal contains a tremor signal characteristic of a human, for example by determining whether frequency components in the feedback signal fall within particular frequency ranges. Upon determining that the feedback signal does contain a tremor signal characteristic of a human, the tremor detector may conclude that the robotic actuator has come into contact with a human, and may cause the actuator to halt its movement.

23 Claims, 6 Drawing Sheets

(56) References Cited

U.S. PATENT DOCUMENTS

| | | | |
|---|---|---|---|
| 8,788,093 B2 | 7/2014 | Sakakibara et al. | |
| 2004/0243147 A1* | 12/2004 | Lipow | G09B 23/28 606/130 |
| 2006/0122819 A1* | 6/2006 | Carmel | G06T 19/00 703/21 |
| 2008/0243005 A1* | 10/2008 | Jung | A61B 5/16 600/481 |
| 2009/0118864 A1* | 5/2009 | Eldridge | B25J 9/1692 700/259 |
| 2010/0235145 A1* | 9/2010 | Ascari | B25J 9/1612 702/190 |
| 2013/0345869 A1* | 12/2013 | Chen | B25J 9/0087 700/255 |
| 2014/0067121 A1* | 3/2014 | Brooks | B25J 9/1676 700/255 |
| 2014/0296940 A1* | 10/2014 | Gross | A61N 1/36135 607/62 |
| 2015/0105907 A1* | 4/2015 | Aiso | B25J 9/1697 700/259 |
| 2015/0290809 A1* | 10/2015 | Nakagawa | B25J 9/1676 700/258 |
| 2015/0367510 A1* | 12/2015 | Naitou | B25J 9/1633 700/253 |
| 2016/0031086 A1* | 2/2016 | Tanabe | B25J 9/1694 700/246 |
| 2016/0089790 A1* | 3/2016 | Wang | B25J 9/1676 700/255 |
| 2016/0243700 A1* | 8/2016 | Naitou | B25J 9/1633 |
| 2016/0243705 A1* | 8/2016 | Naitou | G01L 5/009 |
| 2016/0294487 A1* | 10/2016 | Bengtsson | H04B 13/005 |

OTHER PUBLICATIONS

"Accelerometer Monitor," Accessed at https://web.archive.org/web/20140703070053/https://play.google.com/store/apps/details?id=com.lul.accelerometer&hl=en, Dated Jan. 13, 2014, pp. 3.

"Cusum," Accessed at https://web.archive.org/web/20150530231749/http://en.wikipedia.org/wiki/CUSUM, Last modified on Apr. 29, 2015, pp. 5

"FlexiForce Custom Force Sensing Resistors for OEMs-Tekscan," Accessed at https://web.archive.org/web/20140210190928/http://www.tekscan.com/custom-OEM-force-sensors, Accessed on Jun. 16, 2015, pp. 2

"The Bat Ultrasonic Location System," Accessed at https://web.archive.org/web/20140131181648/http://www.cl.cam.ac.uk/research/dtg/attarchive/bat/, Last modified on Jan. 7, 2005, pp. 4

Albert, M.V., and Kording, K.P., "Determining posture from physiological tremor," Experimental brain research, vol. 215, Issue 3-4, pp. 247-255 (Dec. 2011).

Benjamin, C., et al., "Fast human detection for indoor mobile robots using depth images," IEEE International Conference on Robotics and Automation (ICRA), pp. 1108-1113 (May 6-10, 2013).

Bhattacharjee, T., et al., "Inferring Object Properties from Incidental Contact with a Tactile Sensing Forearm," arXiv:1409.4972, pp. 1-12 (Sep. 17, 2014).

Chang, R-S., et al., "A Parkinson's disease measurement system using laser lines and a CMOS image sensor," Sensors, vol. 11, Issue 2, pp. 1461-1475 (Jan. 26, 2011).

Coxworth, B., "Baxter industrial robot aims at bringing automation to smaller manufacturers," Robotics, Accessed at https://web.archive.org/web/20150324014254/http://www.gizmag.com/rethink-robotics-baxter-industrial-robot/24183/, Dated Sep. 18, 2012, pp. 7.

Davis, A., et al., "The visual microphone: passive recovery of sound from video," ACM Transactions on Graphics (TOG), vol. 33, Issue 4, Article 79, pp. 79.1-79.10 (Jul. 2014).

Gallego, J.A., et al., "A Multimodal Human-Robot Interface to Drive a Neuroprosthesis for Tremor Management," IEEE Transactions on Systems, Man and Cybernetics, Part C: Applications and Reviews, vol. 42, No. 6, pp. 1159-1168 (Nov. 2012).

Ghosh, A. K., and Schwartzbard, A., "A Study in Using Neural Networks for Anomaly and Misuse Detection," USENIX—Proceedings of the 8th USENIX Security Symposium, pp. 141-152 (Aug. 23-36, 1999).

Kang, D-K., "Learning classifiers for misuse detection using a bag of system calls representation," Intelligence and Security Informatics, vol. 3495, pp. 511-516 (2005).

Knight, W., "This robot could transform manufacturing," MIT Technology Review, Accessed at http://www.technologyreview.com/news/429248/this-robot-could-transform-manufacturing/, Dated Sep. 18, 2012, pp. 4.

Kondraske, G.V., "A Noncontacting Human Tremor Sensor and Measurement System," IEEE Transactions on Instrumentation and Measurement, vol. IM-35, Issue 2, pp. 201-206 ( Jun. 1986).

Lawhern., V., et al., "Detecting alpha spindle events in EEG time series using adaptive autoregressive models," BMC neuroscience, vol. 14, Issue 101, pp. 1-16 (Sep. 18, 2013).

Liu, Song., et al., "Change-point detection in time-series data by relative density-ratio estimation," Neural Networks, vol. 43, pp. 1-27 (Jul. 2013).

Marshall, J., and Walsh, E.G., "Physiological Tremor," Journal of Neurology, Neurosurgery, and Psychiatry, vol. 19, Issue 4, pp. 260-267 (Nov. 1956).

McAuley, J. H., and Marsden, C.D., "Physiological and pathological tremors and rhythmic central motor control," Brain, vol. 123, Issue 8, pp. 1545-1567 (Aug. 2000).

Simonite, T., "Should Industrial Robots Be Able to Hurt Their Human Coworkers?," MIT Technology Review, Accessed at http://www.technologyreview.com/news/531356/should-industrial-robots-be-able-to-hurt-their-human-coworkers/, Dated Oct. 6, 2014, pp. 2.

Stein, R. B., and Oĝuztöreli, M.N., "Tremor and other oscillations in neuromuscular systems," Biological cybernetics, vol. 22, Issue 3, (Apr. 20, 1976), first page.

Tan, A. L.Y., "Analysis of Physiological Tremor Mechanisms in Surface Electromyogram," Dissertation, RMIT University, pp. 1-117 (Mar. 2013).

Timmer, J., et al., "Cross-spectral analysis of physiological tremor and muscle activity. I. Theory and application to unsynchronized electromyogram," Biological cybernetics, vol. 78, Issue 5, pp. 349-357 (May 1998).

Zabulis, X., et al., "Multicamera human detection and tracking supporting natural interaction with large-scale displays," Machine vision and applications, vol. 24, Issue 2, pp. 319-336 (Feb. 8, 2012).

Zhang, Y., et al., "Outlier detection techniques for wireless sensor networks: A survey," IEEE Communications Surveys & Tutorials, vol. 12, Issue 2, pp. 159-170 (Apr. 19, 2010).

International Search Report and Written Opinion for International Application No. PCT/US2016/049345 dated Nov. 15, 2016, pp. 7.

* cited by examiner

COMPUTER PROGRAM PRODUCT 600

SIGNAL-BEARING MEDIUM 602

604 AT LEAST ONE OF

ONE OR MORE INSTRUCTIONS TO RECEIVE FEEDBACK SIGNAL(S) ASSOCIATED WITH ROBOTIC ACTUATOR MOVEMENT;
    ONE OR MORE INSTRUCTIONS TO DETERMINE THAT THE FEEDBACK SIGNAL(S) INCLUDE ONE OR MORE TREMOR SIGNALS;
    ONE OR MORE INSTRUCTIONS TO DETERMINE THAT THE TREMOR SIGNAL(S) INDICATE THE PRESENCE OF HUMAN BEINGS AND/OR ANIMALS; AND
    ONE OR MORE INSTRUCTIONS TO STOP THE ROBOTIC ACTUATOR MOVEMENT.

| COMPUTER-READABLE MEDIUM 606 | RECORDABLE MEDIUM 608 | COMMUNICATIONS MEDIUM 610 |

FIG. 6

INCIDENTAL ROBOT-HUMAN CONTACT DETECTION

BACKGROUND

Unless otherwise indicated herein, the materials described in this section are not prior art to the claims in this application and are not admitted to be prior art by inclusion in this section.

Robotic manipulation and machine vision are becoming more widespread in industries such as manufacturing, shipping, and food production, among others. In many cases, robots may share workspaces with human workers or animals. In these situations, measures to reduce incidental contact between robots and humans or animals may be implemented to reduce the likelihood and severity of injuries resulting from such contact.

SUMMARY

The present disclosure generally describes techniques for detection of incidental robot-human contact.

According to some examples, a method is provided to guide actuator movement. The method may include determining a feedback signal associated with a movement of an actuator, determining whether the feedback signal includes a tremor signal characteristic of a human and/or an animal, and halting the movement of the actuator in response to determination that the feedback signal includes the tremor signal.

According to other examples, a tremor detection system is provided. The tremor detection system may include a sensor signal processor configured to receive a feedback signal associated with a movement of a robotic actuator. The tremor detection system may also include a processor block configured to determine that the feedback signal includes a frequency component having a first frequency that is at least 7 Hz and at most 12 Hz and is characteristic of a human and/or an animal. The processor block may be further configured to transmit a control signal causing the robotic actuator to halt the movement in response to determination that the feedback signal includes the frequency component.

According to further examples, a robotic actuator system is provided. The robotic actuator system may include an actuator, a controller, and a tremor detector. The actuator may be configured to perform a physical action in response to a control signal and stop the physical action in response to a stop signal. The controller may be configured to transmit the control signal and the stop signal to the actuator. The tremor detector may be configured to receive a feedback signal associated with the physical action from the actuator and/or the controller, determine that the feedback signal includes a tremor signal falling between 7 Hz and 12 Hz and characteristic of a human and/or an animal, and cause the controller to transmit the stop signal to the actuator in response to determination that the feedback signal includes the tremor signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to detection of incidental robot-human contact.

Briefly stated, technologies are generally described for detection of incidental robot-human contact. In some examples, a robotic actuator movement may generate a feedback signal, such as a haptic signal, a proprioceptive signal, an optical signal, and/or an infrared signal. A tremor detector may determine whether the feedback signal contains a tremor signal characteristic of a human, for example, by determining whether frequency components in the feedback signal fall within particular frequency ranges. Upon determining that the feedback signal does contain a tremor signal characteristic of a human or an animal, the tremor detector may conclude that the robotic actuator has come into contact with a human or animal, and may cause the actuator to halt its movement.

Figure 1:
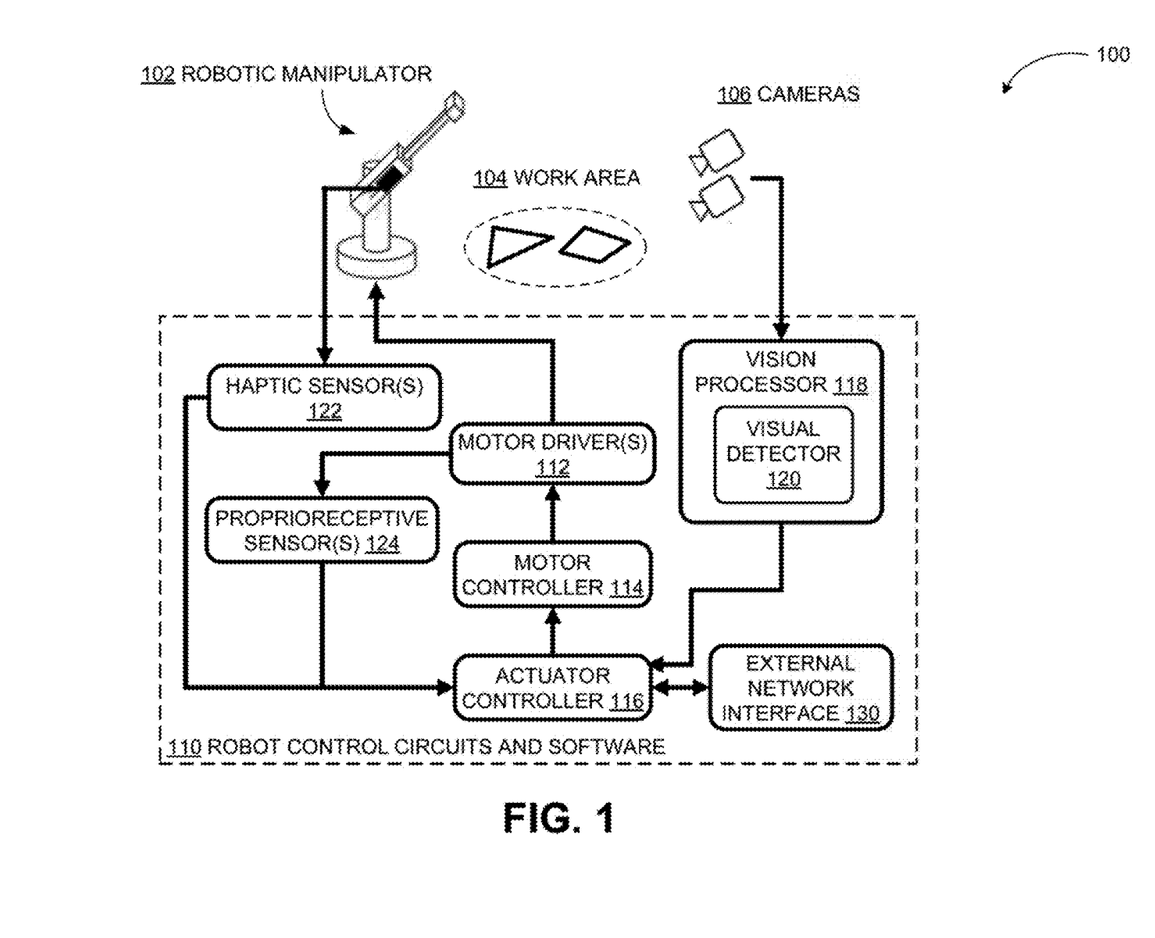
FIG. 1 illustrates an example robotic actuator system.

FIG. 1 illustrates an example robotic actuator system, arranged in accordance with at least some embodiments described herein.

According to a diagram 100, a robotic manipulator 102 and associated robot control circuits and software 110 may be configured to perform one or more tasks within a work area 104. In some embodiments, the robotic manipulator 102, guided by the robot control circuits and software 110, may perform physical actions such as assembling objects, moving objects between different containers, conveyances, and areas, or any other suitable physical task. The robotic manipulator 102 may be stationary with a movable arm/manipulator, or may be an autonomous mobile robot. In some embodiments, an actuator controller 116 may control the movements of the robotic manipulator 102 by sending control signals to a motor controller 114. The motor controller 114 may in turn send control signals to one or more motor drivers 112, which may then supply drive voltage and/or current to motors that cause the robotic manipulator 102 to move. In some embodiments, the actuator controller 116 may control the movements of the robotic manipulator 102 based on a number of inputs. For example, the actuator controller 116 may be configured to execute operations in one or more programs of the robot control circuits and software 110 to cause the robotic manipulator 102 to perform individual movements or series of movements. The actuator controller 116 may also (or instead) execute operations in program(s) received via an external network interface 130 from, for example, an external controller (not shown).

In some embodiments, the actuator controller 116 may control the robotic manipulator 102 based on sensor inputs associated with the movement of the robotic manipulator 102. For example, one or more cameras 106 may be disposed within view of the work area 104 and/or the robotic manipulator 102. The cameras 106 may be configured to detect optical data (for example, visible light images), infrared data, or any other suitable data. The cameras 106 may send the detected data to a vision processor 118 associated with the robot control circuits and software 110. A visual detector 120 associated with the vision processor 118 may then attempt to extract information of interest from the received data. For example, the visual detector 120 may attempt to identify objects present in the work area, orientations of objects within the work area, the orientation of the robotic manipulator 102, and/or any other suitable feature of interest. The visual detector 120 may then provide any extracted information of interest to the actuator controller 116, which may then use the extracted information to guide the movements of the robotic manipulator 102.

In some embodiments, the actuator controller 116 may receive additional inputs from one or more haptic sensors 122. The haptic sensors 122 may be configured to measure pressures applied to different portions of the robotic manipulator 102. For example, the haptic sensors 122 may take the form of a covering or "skin" that may be wrapped around parts of the robotic manipulator 102, and may include one or more pressure detection points (for example, a tactile pixel or "taxel") that undergo a parameter change (for example, in resistance, capacitance, inductance, or some other suitable parameter) upon the application of pressure. The parameter changes may then be converted into pressure measurements by the haptic sensors 122 and/or the actuator controller 116.

The actuator controller 116 may also receive inputs from one or more proprioreceptive (or proprioceptive) sensors 124. The proprioreceptive sensors 124 may be configured to measure forces and/or torques being applied to various joints of the robotic manipulator 102, and may be useful in situations where the robotic manipulator 102 handles a variety of objects, ranging from soft, crushable objects to heavy, robust objects. In some embodiments, the proprioreceptive sensors 124 may be implemented using specialized sensors and/or using other components of the robot control circuits and software 110. For example, the proprioreceptive sensors 124 may be implemented using stress sensors disposed on the robotic manipulator 102. As another example, the proprioreceptive sensors 124 may be implemented using the motor drivers 112. As described above, the motor drivers 112 may supply drive voltages and/or currents to motors that cause the robotic manipulator 102 to move. The drive voltages and/or currents may be proportional to the forces and/or torques being applied at the robotic manipulator 102, and therefore may be converted into proprioreceptive data by the actuator controller 116.

Figure 2:
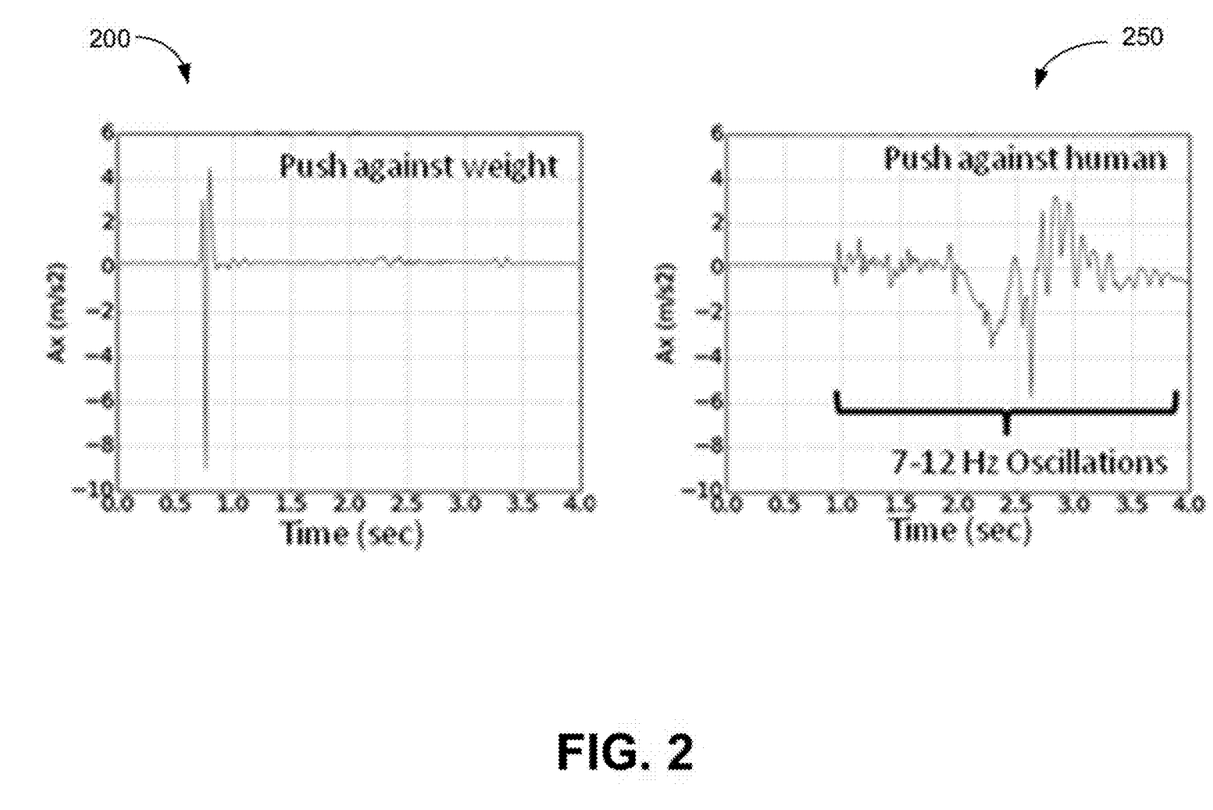
FIG. 2 illustrates how robot-human contact may be identified using tremors.

FIG. 2 illustrates how robot-human contact may be identified using tremors, arranged in accordance with at least some embodiments described herein.

As described above, workspaces where robots coexist with humans or animals may implement measures to reduce incidental contact between different entities. Such measures may involve the detection of contact or impending contact. In some embodiments, detection of physiological tremors may be used to determine whether contact has occurred or is likely to occur. The neuromuscular systems of humans, as well as many animals, exhibit tremors or vibrations with frequencies between about 7 Hz and 10 Hz and having relatively low displacement. Such physiological milli-tremors may not be present in inanimate objects.

Referring to FIG. 2, a chart 200 charts acceleration (on the vertical axis) versus time (on the horizontal axis) for an object pushing against an inanimate weight. The object is equipped with an accelerometer, and is pushed so that it contacts the inanimate weight at approximately 0.75 s and then remains in contact with the weight. As depicted in the chart 200, acceleration of the object remains substantially at zero until contact with the weight, resulting in a number of acceleration oscillations. As the object remains in contact with the weight, the oscillations die down until the acceleration of the object returns to substantially zero. In contrast, a chart 250 charts acceleration versus time for an accelerometer-equipped object pushing against a human. The object first contacts the human slightly before the 1 s mark, and remains in contact with the human subsequently. As depicted in the chart 250, acceleration of the object remains substantially at zero until contact with the human, and then oscillates with frequencies between 7 and 12 Hz as the object remains in contact with the human, instead of returning to zero as in the object-weight case. In some embodiments, such oscillations may be used to differentiate between contact with inanimate objects and contact with humans or animals.

Figure 3:
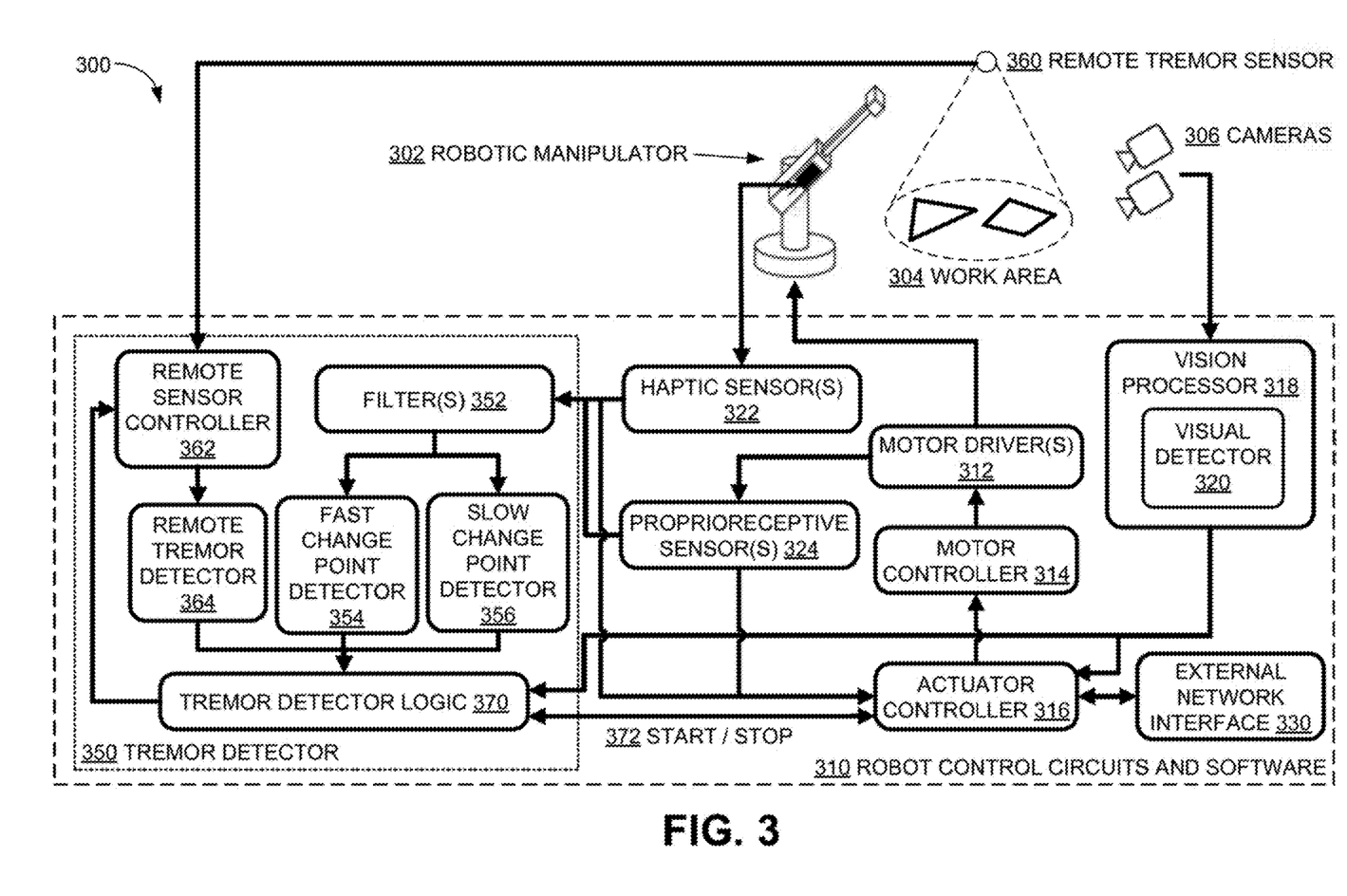
FIG. 3 illustrates an example robotic actuator system where incidental robot-human contact detection may be implemented.

FIG. 3 illustrates an example robotic actuator system where incidental robot-human contact detection may be implemented, arranged in accordance with at least some embodiments described herein.

According to a diagram 300, a robotic manipulator 302 and associated robot control circuits and software 310 may be configured to perform one or more tasks within a work area 304. The robotic manipulator 302, the robot control circuits and software 310, and the work area 304 may be similar to the robotic manipulator 102, the robot control circuits and software 110, and the work area 104 described in FIG. 1. For example, the robotic manipulator 302 may be controlled by an actuator controller 316 (similar to the actuator controller 116) via a motor controller 314 (similar to the motor controller 114) and one or more motor drivers 312 (similar to the motor drivers 112). The actuator controller 316 may control the movements of the robotic manipulator 302 based on programs of the robot control circuits and software 310 and/or received from an external network interface 330.

Similar to the actuator controller 116, in some embodiments the actuator controller 316 may control the robotic manipulator 302 based on sensor inputs associated with the movement of the robotic manipulator 302. Such sensor inputs may include data from vision processor 318 (similar to the vision processor 118), which may use a visual detector 320 (similar to the visual detector 120) to extract relevant data from optical, infrared, or any other suitable data collected from cameras 306 (similar to the cameras 106). Other sensor inputs to the actuator controller 316 may include haptic data provided from one or more haptic sensors 322 (similar to the haptic sensors 122) and/or proprioceptive data provided from one or more proprioceptive sensors 324 (similar to the proprioceptive sensors 124).

The robot control circuits and software 310 may also include a tremor detector 350. The tremor detector 350 may be configured to detect physiological tremor signals as described in FIG. 2 to allow for the prevention or reduction of incidental contact between the robotic manipulator 302 with humans or animals. In some embodiments, the tremor detector 350 may receive sensor feedback signals, such as sensor signals from the haptic sensors 322, the proprioceptive sensors 324, the vision processor 318, and/or a remote tremor sensor 360, and may be configured to detect physiological tremor signals based on the received feedback signals.

The tremor detector 350 may include one or more filters 352, a fast change point detector 354 and a slow change point detector 356 coupled to the filters 352, and tremor detector logic 370. The filters 352 may be configured to receive haptic and proprioceptive sensor data from the haptic sensors 322 and the proprioceptive sensors 324. The filters 352 may be configured to remove frequency components from the received sensor data that are outside the range for physiological tremor, for example those frequency components less than about 7 Hz or greater than about 12 Hz.

The filtered sensor data may then be sent to the fast change point detector 354 and the slow change point detector 356. The fast change point detector 354 and the slow change point detector 356 may each implement change point detection algorithms to monitor time series data to detect the beginning of events. For example, the change point detection algorithms implemented by detector 354 and detector 356 may allow for the detection of the onset of physiological tremors in filtered haptic and proprioceptive sensor data. In one embodiment, the change point detection algorithms implemented by detectors 354 and 356 may monitor the time series of the instantaneous power spectral density or signal amplitude of sensor data between 7 and 12 Hz. If a sudden increase in the power spectral density or signal amplitude of a frequency component of the sensor data between 7 Hz and 12 Hz is detected, the detectors 354 and 356 may conclude that humans and/or animals are present. In some embodiments, the detectors 354 and 356 may also determine whether the increase in power spectral density of signal amplitude is disproportionate with respect to other sensor data frequency components. For example, the detectors 354 and 356 may determine whether other frequency components of the sensor data below 7 Hz and/or greater than 12 Hz also exhibit amplitude/spectral density increases proportional to the increase observed for the frequency component between 7 and 12 Hz. If not, the detectors 354 and 356 may conclude that the increase in signal amplitude and/or spectral density is indeed characteristic of physiological tremor signals associated with human/animal presence.

In some embodiments, the detectors 354 and 356 may implement CUSUM (cumulative sum control chart) change point algorithms, although in other embodiments the detectors 354 and 356 may implement any other suitable change point algorithms.

In some embodiments, machine learning may also be used to augment or enhance the implemented change point algorithms. For example, labeled sequences of force data that indicate when humans or animals are present may be used to train machine learning classifiers based on neural network and/or support vector machine techniques. This may allow for physiological tremor signal detection based on more than just frequency. In any case, the fast change point detector 354 and the slow change point detector 356 may be configured to transmit signals indicating potential human presence to the tremor detector logic 370.

In some embodiments, the fast change point detector 354 may be configured to react quickly (for example, in less than one tremor cycle or less than 0.1 seconds), whereas the slow change point detector 356 may be configured with a slower response time. Accordingly, the fast change point detector 354 may react quickly in order to prevent injury, but may occasionally make overly cautious estimates and erroneously detect human/animal presence (in other words, make false positive errors). In contrast, the slow change point detector 356 may be less cautious and error-prone, but be slower to respond.

The tremor detector 350 may also include a remote sensor controller 362 and a remote tremor detector 364 coupled to the remote sensor controller 362 and the tremor detector logic 370. The remote sensor controller 362 may be coupled to a remote tremor sensor 360, which may be disposed to observe the work area 304 and configured to detect physiological tremors without contact. In some embodiments, the remote tremor sensor 360 may use lasers or remote capacitance measurements to determine tremor presence in objects. The remote tremor sensor 360 may also (or instead) be configured to record video data of the work area 304, and the video data may be subsequently processed to amplify small motions characteristic of physiological tremors. The remote tremor sensor 360 may be controlled by the remote sensor controller 362, which may be configured to adjust the orientation of the remote tremor sensor 360 if necessary. Data collected by the remote tremor sensor 360 may then be passed to the remote tremor detector 364, which may implement change point algorithms as described above and may be configured to transmit signals indicating potential human or animal presence to the tremor detector logic 370. In some embodiments, the tremor detector logic 370 may instruct the remote sensor controller 362 to adjust the orientation of the remote tremor sensor 360, for example to focus on particular objects or areas of interest.

The tremor detector logic 370 may receive signals from the fast change point detector 354, the slow change point detector 356, and the remote tremor detector 364. In some embodiments, the tremor detector logic 370 may also be configured to receive signals from the vision processor 318. For example, the visual detector 320 may be configured to detect whether humans or animals are present in the work area 304 based on data from the cameras 306. If the visual detector determines that humans or animals are present, then the vision processor 318 may transmit a signal indicating human/animal presence to the tremor detector logic 370.

The tremor detector logic 370 may then use the received signals to determine whether unintended contact between the robotic manipulator 302 and a human or animal has occurred or is about to occur. If so, the tremor detector logic 370 may transmit a signal 372 instructing the actuator controller 316 to stop movement of the robotic manipulator 302. For example, if signals from the fast change point detector 354 and the slow change point detector 356 indicate that physiological tremors have been detected, then tremor detector logic 370 may determine that the robotic manipulator 302 has contacted a human or animal, and may send the signal 372 instructing actuator controller 316 to stop movement of the robotic manipulator 302. Similarly, if signals from the remote tremor detector 364 indicate that a human or animal is present in the work area 304 and that contact between the robotic manipulator 302 and the human or animal is imminent, then tremor detector logic 370 may send the signal 372 instructing actuator controller 316 to stop movement of the robotic manipulator 302.

In some embodiments, the tremor detector logic 370 may subsequently send the signal 372 instructing actuator controller 316 to resume movement of the robotic manipulator 302. For example, the tremor detector logic 370 may determine that the robotic manipulator 302 is no longer in contact with a human or animal, based on sensor inputs from the haptic sensors 322, the proprioceptive sensors 324, the remote tremor detector 364, and/or the vision processor 318. In some embodiments, the tremor detector logic 370 may send the signal 372 instructing actuator controller 316 to restart movement of the robotic manipulator 302 in response to determining that robot-human contact was erroneously detected. For example, suppose that the tremor detector logic 370 initially receives a signal from the fast change point detector 354 indicating that physiological tremors have been detected. In response, the tremor detector logic 370 may instruct the actuator controller 316 to stop movement of the robotic manipulator 302 via the signal 372. However, suppose that the tremor detector logic 370 subsequently receives a signal from the slow change point detector 356, the remote tremor detector 364, and/or the visual detector 320 indicating that no physiological tremors or humans/animals have been detected. Because the fast change point detector 354 may be prone to false positives, the tremor detector logic 370 may conclude that no robot-human contact has actually occurred, and may send the signal 372 instructing the actuator controller 316 to restart movement.

While in the above description the tremor detector 350 operates based on feedback signals from the haptic sensors 322, the proprioceptive sensors 324, the remote tremor sensor 360, and the cameras 306, in some embodiments the tremor detector 350 may operate based on more or fewer feedback signals from more or fewer sensors.

Figure 4:
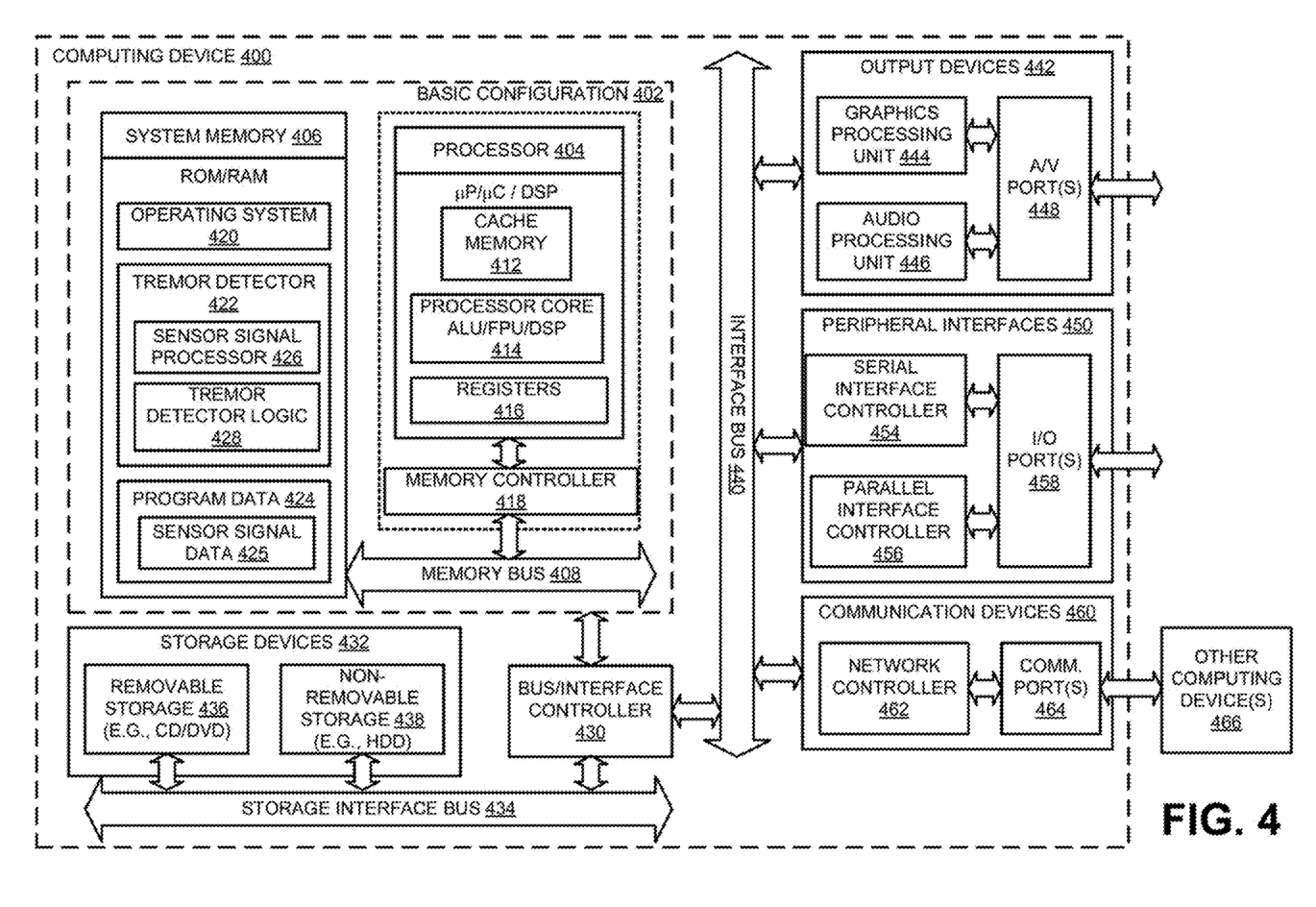
FIG. 4 illustrates a general purpose computing device, which may be used to provide incidental robot-human contact detection.

FIG. 4 illustrates a general purpose computing device 400, which may be used to provide incidental robot-human contact detection, arranged in accordance with at least some embodiments described herein.

For example, the computing device 400 may be used to detect robot-human contact as described herein. In an example basic configuration 402, the computing device 400 may include one or more processors 404 and a system memory 406. A memory bus 408 may be used to communicate between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a level cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a tremor detector 422, and program data 424. The tremor detector 422 may include a sensor signal processor 426 and tremor detector logic 428 to determine whether sensor signals indicate incidental human contact, as described herein. The program data 424 may include, among other data, sensor signal data 425 or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Figure 5:
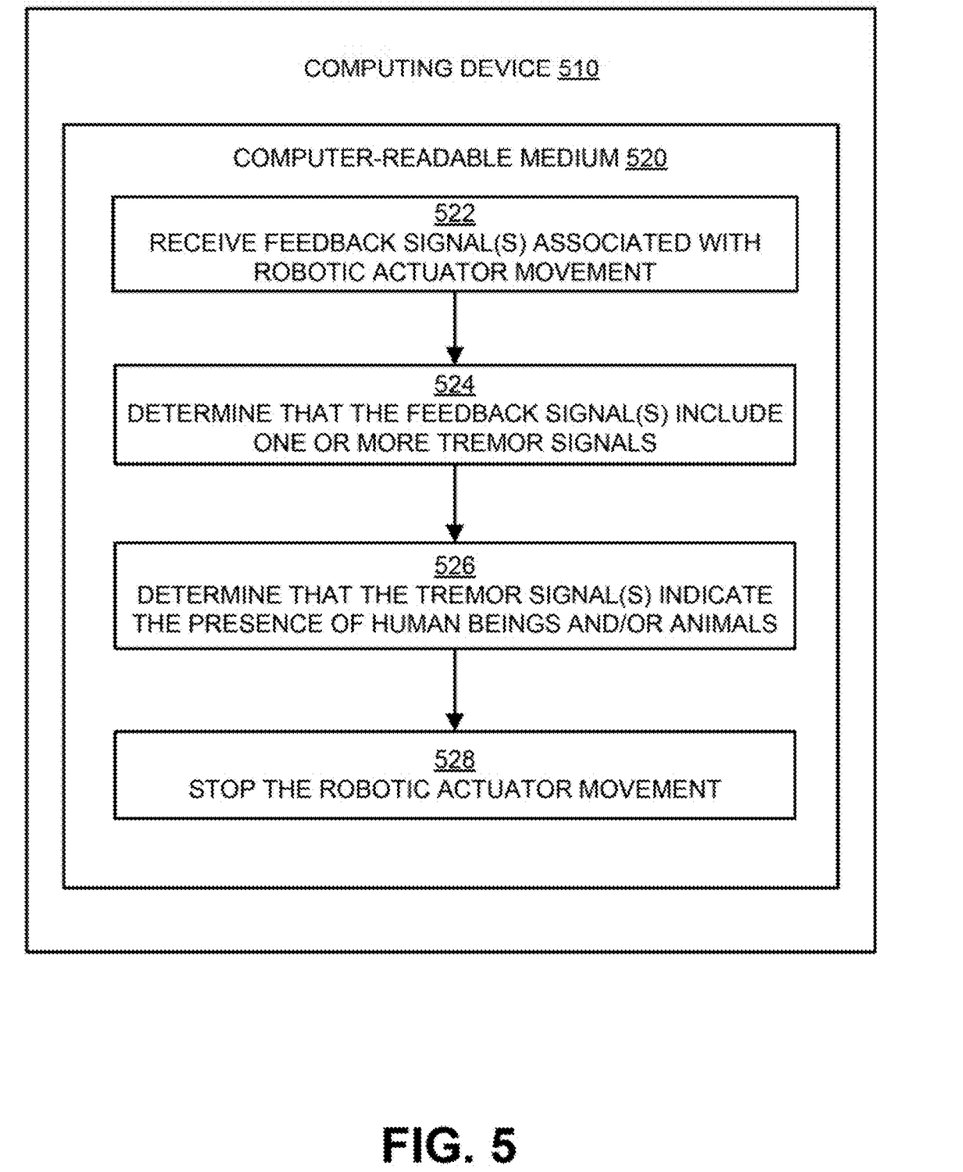
FIG. 5 is a flow diagram illustrating an example method to detect incidental robot-human contact that may be performed by a computing device such as the computing device in FIG. 4.

FIG. 5 is a flow diagram illustrating an example method to detect incidental robot-human contact that may be performed by a computing device such as the computing device in FIG. 4, arranged in accordance with at least some embodiments described herein.

Example methods may include one or more operations, functions or actions as illustrated by one or more of blocks 522, 524, 526, and/or 528, and may in some embodiments be performed by a computing device such as the computing device 400 in FIG. 4. The operations described in the blocks 522-528 may also be stored as computer-executable instructions in a computer-readable medium such as a computer-readable medium 520 of a computing device 510.

An example process to detect incidental robot-human contact may begin with block 522, "RECEIVE FEEDBACK SIGNAL(S) ASSOCIATED WITH ROBOTIC ACTUATOR MOVEMENT", where a tremor detector (for example, the tremor detector 350) may receive feedback signals from one or more sensors (for example, the haptic sensors 322, the proprioreceptive sensors 324, the remote tremor sensor 360, and/or the cameras 306) configured to monitor movement of a robotic actuator (for example, the robotic manipulator 302).

Block 522 may be followed by block 524, "DETERMINE THAT THE FEEDBACK SIGNAL(S) INCLUDE ONE OR MORE TREMOR SIGNALS", where the tremor detector may determine whether the feedback signals include tremor signals. For example, the tremor detector may use a fast change point detector (for example, the fast change point detector 354) and/or a slow change point detector (for example, the slow change point detector 356) to determine whether the received feedback signals include tremor signals.

Block 524 may be followed by block 526, "DETERMINE THAT THE TREMOR SIGNAL(S) INDICATE THE PRESENCE OF HUMANS AND/OR ANIMALS", where the tremor detector may determine whether the detected tremor signals are characteristic of humans and/or animals. For example, the tremor detector may determine whether the detected tremor signals are greater than 7 Hz and less than 12 Hz, as described above. In some embodiments, the tremor detector may also use other feedback signals (for example, data from cameras 306) to determine whether humans and/or animals could be responsible for the detected tremor signals.

Block 526 may be followed by block 528, "STOP THE ROBOTIC ACTUATOR MOVEMENT", where the tremor detector may cause the robotic actuator to halt its movement if the detected tremor signals are determined to be characteristic of contact between the robotic actuator and a human and/or animal, as described above.

Figure 6:
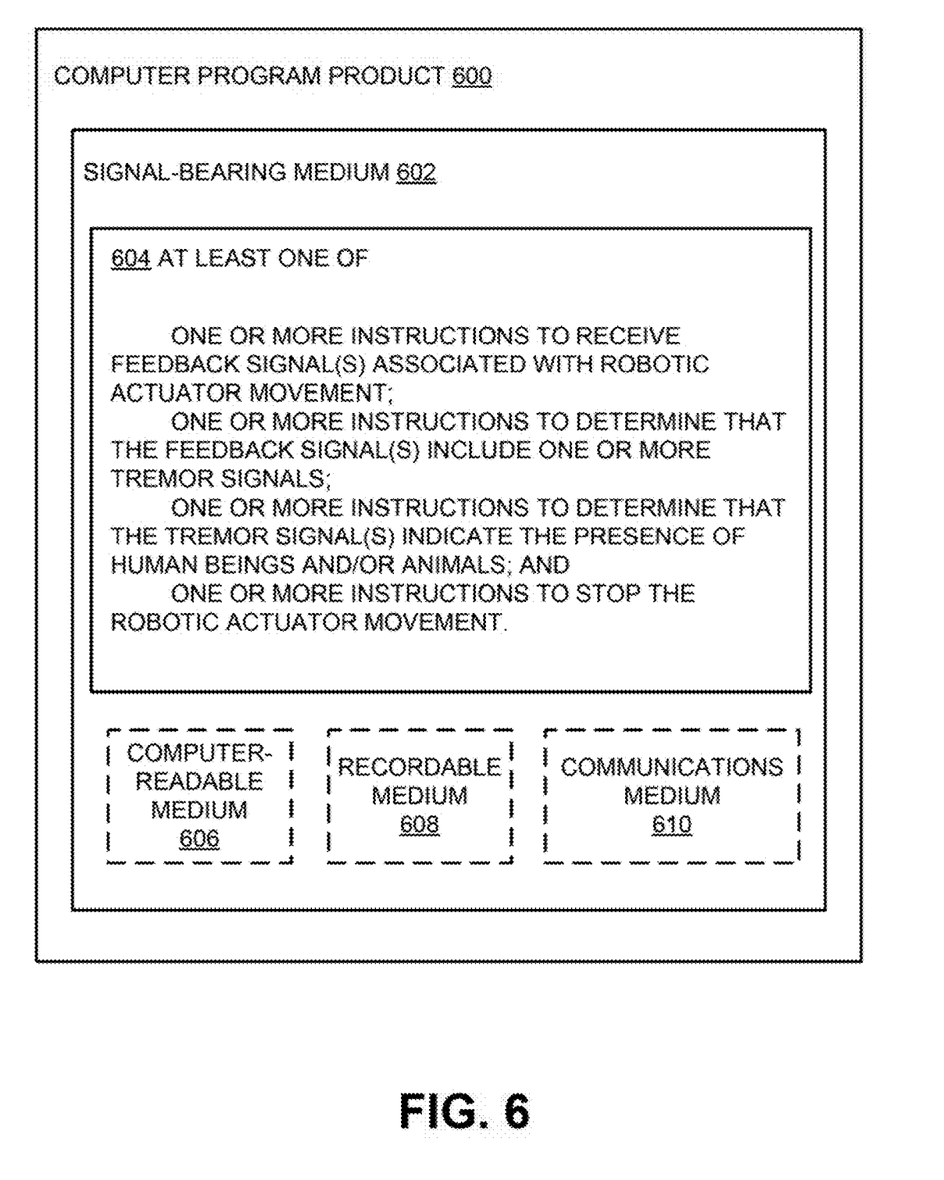
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, a computer program product 600 may include a signal bearing medium 602 that may also include one or more machine readable instructions 604 that, when executed by, for example, a processor may provide the functionality described herein. Thus, for example, referring to the processor 404 in FIG. 4, the tremor detector 422 may undertake one or more of the tasks shown in FIG. 6 in response to the instructions 604 conveyed to the processor 404 by the medium 602 to perform actions associated with detection of incidental robot-human contact as described herein. Some of those instructions may include, for example, instructions to receive feedback signal(s) associated with robotic actuator movement, determine that the feedback signal(s) include one or more tremor signals, determine that the tremor signal(s) indicate the presence of humans and/or animals, and/or stop the robotic actuator movement, according to some embodiments described herein.

In some implementations, the signal bearing media 602 depicted in FIG. 6 may encompass computer-readable media 606, such as, but not limited to, a hard disk drive, a solid state drive, a compact disc (CD), a digital versatile disk (DVD), a digital tape, memory, etc. In some implementations, the signal bearing media 602 may encompass recordable media 607, such as, but not limited to, memory, read/write (R/W) CDs, R/W DVDs, etc. In some implementations, the signal bearing media 602 may encompass communications media 610, such as, but not limited to, a digital and/or an analog communication medium (e.g., a fiber optic cable, a waveguide, a wired communications link, a wireless communication link, etc.). Thus, for example, the program product 600 may be conveyed to one or more modules of the processor 404 by an RF signal bearing medium, where the signal bearing media 602 is conveyed by the wireless communications media 610 (e.g., a wireless communications medium conforming with the IEEE 802.11 standard).

According to some examples, a method is provided to guide actuator movement. The method may include determining a feedback signal associated with a movement of an actuator, determining whether the feedback signal includes a tremor signal characteristic of a human and/or an animal, and halting the movement of the actuator in response to determination that the feedback signal includes the tremor signal.

According to some embodiments, determining whether the feedback signal includes a tremor signal characteristic of a human and/or an animal may include determining whether the feedback signal includes a frequency component having a first frequency that is at least 7 Hz and at most 12 Hz. In some embodiments, determining whether the feedback signal includes a tremor signal may include detecting a disproportionate increase in an amplitude of the frequency component with respect to at least one other frequency component in the feedback signal having a second frequency less than 7 Hz or greater than 12 Hz.

According to other embodiments, determining the feedback signal may include determining a haptic signal associated with a pressure detected on the actuator and/or a proprioreceptive signal associated with a force and/or a torque applied at a joint of the actuator. In some embodiments, the proprioceptive signal may be determined from a motor driver current and/or a stress signal. In some embodiments, determining the feedback signal may include receiving a remote signal from a remote sensor. The remote signal may include optical image data and/or infrared data. In some embodiments, determining whether the feedback signal includes a tremor signal may include initially evaluating the feedback signal with a fast change point detector and subsequently evaluating the feedback signal with a slow change point detector.

According to other examples, a tremor detection system is provided. The tremor detection system may include a sensor signal processor configured to receive a feedback signal associated with a movement of a robotic actuator. The tremor detection system may also include a processor block configured to determine that the feedback signal includes a frequency component having a first frequency that is at least 7 Hz and at most 12 Hz and is characteristic of a human and/or an animal. The processor block may be further configured to transmit a control signal causing the robotic actuator to halt the movement in response to determination that the feedback signal includes the frequency component.

According to some embodiments, the processor block may be further configured to detect a disproportionate increase in an amplitude of the frequency component with respect to at least one other frequency component of the feedback signal having a second frequency less than 7 Hz or greater than 12 Hz and determine that the frequency component is characteristic of a human and/or an animal based on the detection.

According to other embodiments, the feedback signal may include a haptic signal associated with a pressure detected on the robotic actuator and/or a proprioceptive signal associated with a force and/or a torque applied at a joint of the actuator. The proprioceptive signal may be based on a motor driver current and/or a stress signal. In some embodiments, the feedback signal may include a remote signal from a remote sensor. The remote signal may include optical image data and/or infrared data. The processor block may be further configured to initially evaluate the frequency component with a fast change point detector, subsequently evaluate the frequency component with a slow change point detector, and determine that the frequency component is characteristic of a human and/or an animal based on the evaluations.

According to further examples, a robotic actuator system is provided. The robotic actuator system may include an actuator, a controller, and a tremor detector. The actuator may be configured to perform a physical action in response to a control signal and stop the physical action in response to a stop signal. The controller may be configured to transmit the control signal and the stop signal to the actuator. The tremor detector may be configured to receive a feedback signal associated with the physical action from the actuator and/or the controller, determine that the feedback signal includes a tremor signal falling between 7 Hz and 12 Hz and characteristic of a human and/or an animal, and cause the controller to transmit the stop signal to the actuator in response to determination that the feedback signal includes the tremor signal.

According to some embodiments, the tremor detector may be further configured to determine that the tremor signal is characteristic of a human and/or an animal upon detection of a disproportionate increase in an amplitude of the tremor signal with respect to at least one other tremor signal in the feedback signal, where the other tremor signal(s) have a frequency less than 7 Hz or greater than 12 Hz. The feedback signal may include a haptic signal associated with a pressure detected on the robotic actuator during performance of the physical action and/or a proprioceptive signal associated with a force and/or a torque applied at a joint of the actuator during performance of the physical action. The proprioceptive signal may be based on a motor driver current and/or a stress signal.

According to other embodiments, the feedback signal may include a remote signal from a remote sensor. The remote signal may include optical image data and/or infrared data. The tremor detector may be further configured to initially evaluate the feedback signal with a fast change point detector, subsequently evaluate the feedback signal with a slow change point detector, and determine that the feedback signal includes the tremor signal based on the evaluations.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/ or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to guide actuator movement, the method comprising:
   receiving a feedback signal associated with a movement of an actuator;
   filtering the received feedback signal to remove frequency components that have a frequency less than 7 Hz or greater than 12 Hz;
   monitoring a power spectral density of the filtered feedback signal, wherein the filtered feedback signal includes information representative of a characteristic of at least one of a human or an animal;
   detecting whether there is an increase in the power spectral density of the filtered feedback signal;
   determining that the actuator has come into contact with the at least one of the human or the animal, based on a detection of the increase in the power spectral density of the filtered feedback signal; and
   in response to the determination that the actuator has come into contact with the at least one of the human or the animal, halting the movement of the actuator.

2. The method of claim 1, wherein detecting whether there is the increase in the power spectral density of the filtered feedback signal comprises:
   detecting whether there is an increase in the power spectral density of the filtered feedback signal with respect to at least one other frequency component of the received feedback signal, wherein the at least one other frequency component has a frequency less than 7 Hz or greater than 12 Hz.

3. The method of claim 1, wherein receiving the feedback signal includes receiving a haptic signal associated with a pressure detected on the actuator.

4. The method of claim 1, wherein receiving the feedback signal includes receiving a proprioceptive signal associated with at least one of a force and a torque applied at a joint of the actuator.

5. The method of claim 4, wherein receiving the proprioceptive signal comprises detecting the proprioceptive signal from at least one of a motor driver current and a stress signal.

6. The method of claim 1, wherein receiving the feedback signal comprises receiving a remote signal from a remote sensor that generates the remote signal in response to the movement of the actuator.

7. The method of claim 6, wherein receiving the remote signal includes receiving at least one of optical image data and infrared data.

8. The method of claim 1, wherein detecting whether there is the increase in the power spectral density of the filtered feedback signal comprises initially evaluating the filtered feedback signal with a first change point detector and subsequently evaluating the filtered feedback signal with a second change point detector, and wherein the first change point detector reacts more quickly than the second change point detector.

9. A tremor detection system, comprising:
   a sensor signal processor configured to receive a feedback signal associated with a movement of a robotic actuator; and
   a processor block, operatively coupled to the sensor signal processor, configured to:
      determine that the feedback signal includes a frequency component that has a first frequency that is at least 7 Hz and at most 12 Hz, and that includes information representative of a characteristic of at least one of a human or an animal;
      monitor a power spectral density of the frequency component;
      detect whether there is an increase in the power spectral density of the frequency component with respect to at least one other frequency component of the feedback signal, wherein the at least one other frequency component has a second frequency less than 7 Hz or greater than 12 Hz;
      determine that the robotic actuator has come into contact with the at least one of the human or the animal, based on a detection of the increase in the power spectral density of the frequency component; and
      in response to the determination that the robotic actuator has come into contact with the at least one of the human or the animal, transmit a control signal to cause the robotic actuator to halt the movement.

10. The system of claim 9, wherein the processor block is configured to:
    detect an increase in an amplitude of the frequency component with respect to the at least one other frequency component of the feedback signal; and
    determine that the robotic actuator has come into contact with the at least one of the human or the animal, based on the detection of the increase in the amplitude of the frequency component.

11. The system of claim 9, wherein the feedback signal includes a haptic signal associated with a pressure detected on the robotic actuator.

12. The system of claim 9, wherein the feedback signal includes a proprioceptive signal associated with at least one of a force and a torque applied at a joint of the robotic actuator.

13. The system of claim 12, wherein the proprioceptive signal is based on at least one of a motor driver current and a stress signal.

14. The system of claim 9, wherein the feedback signal includes a remote signal from a remote sensor that generates the remote signal in response to the movement of the robotic actuator.

15. The system of claim 14, wherein the remote signal includes at least one of optical image data and infrared data.

16. The system of claim 9, wherein to detect whether there is the increase in the power spectral density of the frequency component, the processor block is configured to:
    initially evaluate the frequency component with a first change point detector; and
    subsequently evaluate the frequency component with a second change point detector,
    wherein the first change point detector reacts more quickly than the second change point detector.

17. A robotic actuator system, comprising:
    an actuator configured to:

perform a physical action in response to a control signal; and stop the physical action in response to a stop signal;

a controller operatively coupled to the actuator and configured to transmit the control signal and the stop signal to the actuator; and a tremor detector operatively coupled to the controller and configured to:

receive a feedback signal associated with the physical action from at least one of the actuator and the controller;

determine that the feedback signal includes a tremor signal, wherein the tremor signal includes a frequency component that has a first frequency between 7 Hz and 12 Hz, and wherein the tremor signal includes information representative of a characteristic of at least one of a human or an animal;

monitor a power spectral density of the tremor signal;

detect whether there is an increase in the power spectral density of the tremor signal with respect to at least one other frequency component of the feedback signal, wherein the at least one other frequency component has a second frequency less than 7 Hz or greater than 12 Hz;

determine that the actuator has come into contact with at least one of the human or the animal, based on a detection of the increase in the power spectral density of the tremor signal; and in response to s determination that the actuator has come into contact with the at least one of the human or the animal, cause the controller to transmit the stop signal to the actuator.

18. The system of claim 17, wherein the tremor detector is configured to determine that the actuator has come into contact with the at least one of the human or the animal, in response to a detection of an increase in an amplitude of the tremor signal with respect to the at least one other frequency component.

19. The system of claim 17, wherein the feedback signal includes at least one of:

a haptic signal associated with a pressure detected on the actuator during the performance of the physical action; and a proprioceptive signal associated with at least one of a force and a torque applied at a joint of the actuator during the performance of the physical action.

20. The system of claim 19, wherein the proprioceptive signal is based on at least one of a motor driver current and a stress signal.

21. The system of claim 17, wherein the feedback signal includes a remote signal from a remote sensor that generates the remote signal in response to a movement of the actuator.

22. The system of claim 21, wherein the remote signal includes at least one of optical image data and infrared data.

23. The system of claim 17, wherein to detect whether there is the increase in the power spectral density of the tremor signal, the tremor detector is configured to:

initially evaluate the tremor signal with a first change point detector; and subsequently evaluate the tremor signal with a second change point detector, wherein the first change point detector reacts more quickly than the second change point detector.

* * * * *

UNITED STATES PATENT AND TRADEMARK OFFICE
CERTIFICATE OF CORRECTION

PATENT NO. : 9,868,213 B2
APPLICATION NO. : 14/823500
DATED : January 16, 2018
INVENTOR(S) : Fine et al.

It is certified that error appears in the above-identified patent and that said Letters Patent is hereby corrected as shown below:

On the Title Page

In item (72), under "Inventors", in Column 1, Line 1, delete "Kevin S Fine," and insert -- Kevin S. Fine, --, therefor.

In the Specification

In Column 2, Line 22, delete "all arranged...herein." and insert the same at Line 23, as a continuation paragraph, therefor.

In Column 3, Line 6, delete "may in turn" and insert -- may, in turn, --, therefor.

In Column 4, Lines 64-65, delete "embodiments the" and insert -- embodiments, the --, therefor.

In Column 5, Line 32, delete "example those" and insert -- example, those --, therefor.

In Column 6, Line 46, delete "example to" and insert -- example, to --, therefor.

In Column 7, Line 41, delete "embodiments the" and insert -- embodiments, the --, therefor.

In Column 7, Line 60, delete "one more" and insert -- one or more --, therefor.

In Column 7, Lines 60-61, delete "as a level cache" and insert -- as a cache --, therefor.

In Column 8, Line 38, delete "solid state drives," and insert -- solid state drives (SSD), --, therefor.

In Column 8, Line 48, delete "peripheral interfaces 444," and insert -- peripheral interfaces 450, --, therefor.

Signed and Sealed this
Twenty-fourth Day of July, 2018

Andrei Iancu
*Director of the United States Patent and Trademark Office*

CERTIFICATE OF CORRECTION (continued)
U.S. Pat. No. 9,868,213 B2

In Column 8, Lines 48-49, delete "communication devices 466)" and insert -- communication devices 460) --, therefor.

In Column 8, Line 51, delete "graphics processing unit 448" and insert -- graphics processing unit 444 --, therefor.

In Column 8, Line 52, delete "audio processing unit 450," and insert -- audio processing unit 446, --, therefor.

In Column 8, Line 54, delete "A/V ports 452." and insert -- A/V ports 448. --, therefor.

In Column 8, Line 55, delete "peripheral interfaces 444" and insert -- peripheral interfaces 450 --, therefor.

In Column 8, Line 61, delete "communication device 466" and insert -- communication device 460 --, therefor.

In Column 8, Line 62, delete "network controller 460," and insert -- network controller 462, --, therefor.

In Column 8, Lines 63-64, delete "computing devices 462" and insert -- computing devices 466 --, therefor.

In Column 8, Line 66, delete "computing devices 462" and insert -- computing devices 466 --, therefor.

In Column 10, Line 26, delete "signal bearing media" and insert -- signal bearing medium --, therefor.

In Column 10, Line 27, delete "computer-readable media" and insert -- computer-readable medium --, therefor.

In Column 10, Lines 28-29, delete "a hard disk drive, a solid state drive," and insert -- a hard disk drive (HDD), a solid state drive (SSD), --, therefor.

In Column 10, Line 31, delete "signal bearing media" and insert -- signal bearing medium --, therefor.

In Column 10, Lines 31-32, delete "recordable media" and insert -- recordable medium --, therefor.

In Column 10, Line 34, delete "signal bearing media" and insert -- signal bearing medium --, therefor.

In Column 10, Lines 34-35, delete "communications media" and insert -- communications medium --, therefor.

In Column 10, Line 37, delete "communications link," and insert -- communication link, --, therefor.

CERTIFICATE OF CORRECTION (continued)
U.S. Pat. No. 9,868,213 B2

In Column 10, Line 38, delete "the program" and insert -- the computer program --, therefor.

In Column 10, Line 41, delete "signal bearing media" and insert -- signal bearing medium --, therefor.

In Column 10, Line 42, delete "communications media" and insert -- communications medium --, therefor.

In Column 11, Line 42, delete "subsequently evaluate" and insert -- subsequently, evaluate --, therefor.

In Column 12, Line 58, delete "and or" and insert -- and/or --, therefor.

In Column 13, Lines 18-19, delete "hard disk drive," and insert -- hard disk drive (HDD), --, therefor.

In Column 13, Line 20, delete "solid state drive," and insert -- solid state drive (SSD), --, therefor.

In Column 13, Line 23, delete "communications link," and insert -- communication link, --, therefor.

In Column 14, Line 20, delete "recitation no" and insert -- recitation, no --, therefor.

In Column 14, Line 43, delete "general such" and insert -- general, such --, therefor.

In the Claims

In Column 17, Line 29, in Claim 17, delete "to s" and insert -- to the --, therefor.